(12) United States Patent
Burns et al.

(10) Patent No.: US 9,556,975 B2
(45) Date of Patent: Jan. 31, 2017

(54) INSULATING STRUCTURE

(71) Applicant: Preformed Line Products, Mayfield Village, OH (US)

(72) Inventors: Mark Burns, Macedonia, OH (US); Lan-Ping Ling, Beachwood, OH (US); David C. Sunkle, Strongsville, OH (US)

(73) Assignee: Preformed Line Products, Mayfield Village, OH (US)

( * ) Notice: Subject to any disclaimer, the term of this patent is extended or adjusted under 35 U.S.C. 154(b) by 18 days.

(21) Appl. No.: 14/305,991

(22) Filed: Jun. 16, 2014

(65) Prior Publication Data

US 2014/0367531 A1 Dec. 18, 2014

Related U.S. Application Data

(60) Provisional application No. 61/835,332, filed on Jun. 14, 2013.

(51) Int. Cl.
*F16L 3/00* (2006.01)
*F16L 3/10* (2006.01)
*H02G 7/05* (2006.01)

(52) U.S. Cl.
CPC .............. *F16L 3/1041* (2013.01); *F16L 3/10* (2013.01); *H02G 7/053* (2013.01)

(58) Field of Classification Search
CPC .......... F16L 3/10; F16L 3/1041; F16L 3/1016; F16L 3/1058; F16L 3/1091; H02G 7/053; H02G 7/056; H02G 7/05; H02G 7/12
USPC ........................................................ 248/73
See application file for complete search history.

(56) References Cited

U.S. PATENT DOCUMENTS

| | | | |
|---|---|---|---|
| 2,975,997 A | 3/1961 | Lendsey | |
| 3,633,858 A | 1/1972 | Houston et al. | |
| 4,178,470 A * | 12/1979 | Jean | H01B 17/22 174/156 |
| 4,258,228 A * | 3/1981 | Jean | H01B 17/22 174/168 |

(Continued)

FOREIGN PATENT DOCUMENTS

| | | |
|---|---|---|
| EP | 2433579 A1 | 3/2012 |
| GB | 2188795 A | 10/1987 |

OTHER PUBLICATIONS

Int. Search Report cited in PCT Application No. PCT/US2014/042564 dated Oct. 20, 2014, 15 pgs.

*Primary Examiner* — Christopher E Garft
(74) *Attorney, Agent, or Firm* — Cooper Legal Group LLC

(57) ABSTRACT

A structure for supporting a wire includes a first portion extending along a first axis. The first portion includes a body portion and an alignment portion. The alignment portion defines a first alignment opening through which the alignment portion receives a fastener. The first alignment opening extends between a first side and a second side. The first side has a first surface portion and a second surface portion. The first surface portion is separated a first distance from the first axis. The second surface portion is separated a second distance from the first axis. The first distance is different than the second distance. The structure includes a second portion defining a second alignment opening through which the second portion receives the fastener. The second portion is spaced a distance from the body portion to define a wire opening into which the wire is received for support by the structure.

20 Claims, 6 Drawing Sheets

(56) References Cited

U.S. PATENT DOCUMENTS

| | | | |
|---|---|---|---|
| 5,195,704 A | | 3/1993 | Louie |
| 5,435,507 A | * | 7/1995 | Murphy ............... F16L 3/10 |
| | | | 174/40 R |
| 5,704,816 A | * | 1/1998 | Polidori ............. H01R 4/44 |
| | | | 403/391 |

* cited by examiner

INSULATING STRUCTURE

CROSS-REFERENCE TO RELATED APPLICATIONS

This application claims priority to U.S. patent application Ser. No. 61/835,332, filed on Jun. 14, 2013, entitled "INSULATING STRUCTURE," which is hereby incorporated by reference.

TECHNICAL FIELD

The instant application is generally directed towards an insulating structure for supporting a wire.

BACKGROUND

An insulating structure can support a wire. The wire can include a conductor, for example.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a structure for supporting a wire comprises a first portion extending along a first axis. The first portion comprises a body portion and an alignment portion coupled to the body portion. The alignment portion defines a first alignment opening through which the alignment portion is configured to receive a first fastener. The first alignment opening extends between a first side of the alignment portion and a second side of the alignment portion. The first side of the alignment portion has a first surface portion and a second surface portion. The first surface portion is separated a first distance from the first axis. The second surface portion is separated a second distance from the first axis. The first distance is different than the second distance. The structure comprises a second portion defining a second alignment opening through which the second portion is configured to receive the first fastener such that the second portion is attached to the first portion. The second portion is spaced a distance from the body portion of the first portion to define a wire opening into which the wire is received for support by the structure.

In an example, a structure for supporting a wire is provided comprising a first portion extending along a first axis. The first portion comprises a body portion and an alignment portion coupled to the body portion. The alignment portion defines a first alignment opening through which the alignment portion is configured to receive a first fastener. The first alignment opening extends between a first side of the alignment portion and a second side of the alignment portion. The first alignment opening has an elongated, non-circular cross-sectional shape having an opening length extending along the first axis and an opening width extending substantially transverse to the first axis. The opening length is greater than the opening width. The structure includes a second portion defining a second alignment opening through which the second portion is configured to receive the first fastener such that the second portion is attached to the first portion. The second portion is spaced a distance from the body portion of the first portion to define a wire opening into which the wire is received for support by the structure.

In an example, a kit comprises an alignment portion configured to be coupled to a body portion of a structure for supporting a wire, where the body portion extends along a first axis. The alignment portion defines a first alignment opening through which the alignment portion is configured to receive a first fastener. The first alignment opening extends between a first side of the alignment portion and a second side of the alignment portion. The first side of the alignment portion has a first surface portion and a second surface portion. The first surface portion is separated a first distance from the first axis. The second surface portion is separated a second distance from the first axis. The first distance is different than the second distance.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
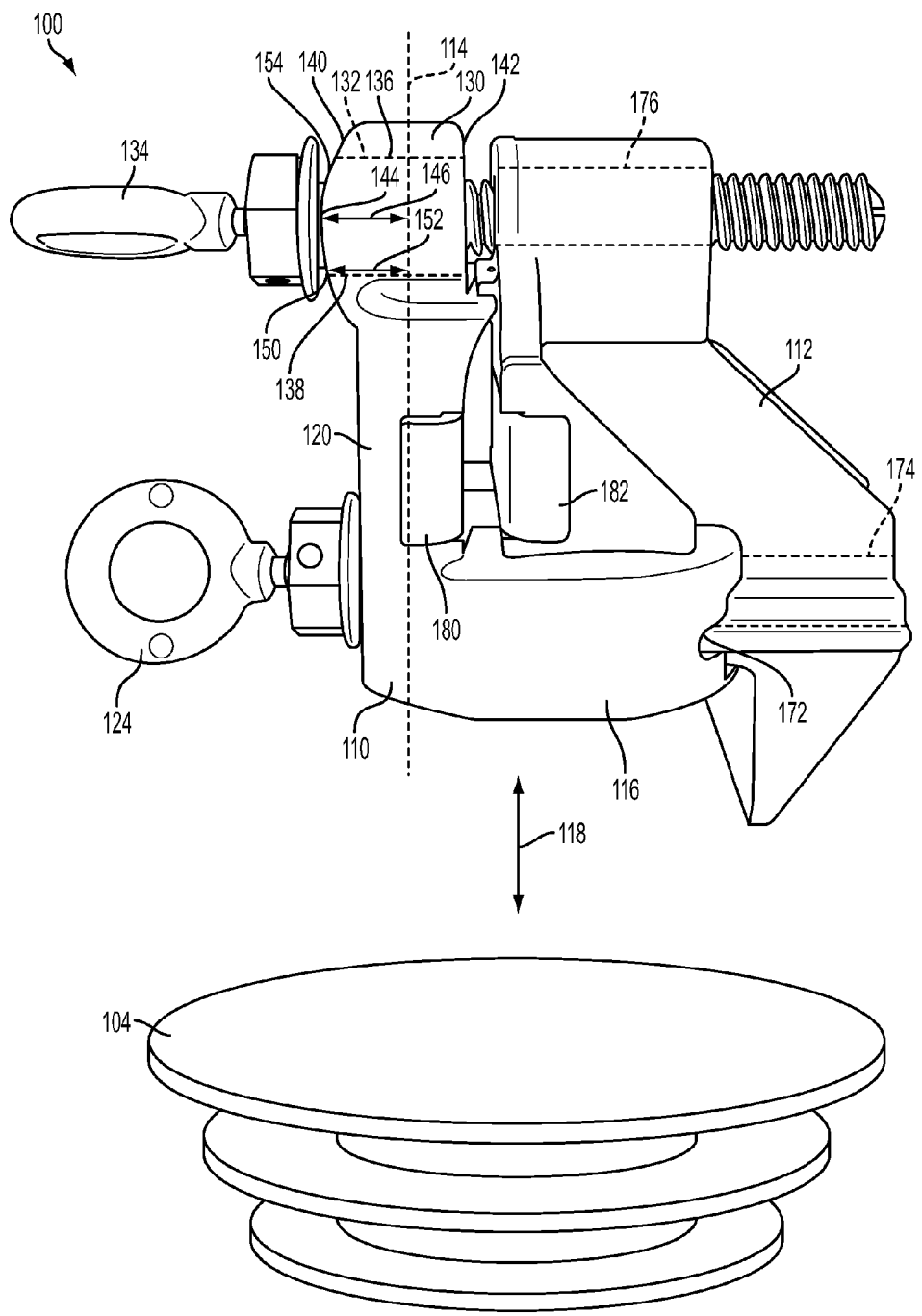
FIG. 1 illustrates an example structure.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. At least some dimensions in the drawing may not be to scale.

Turning to FIG. 1, an example structure 100 for supporting a wire 102 (wire 102 illustrated in FIG. 4) is illustrated. In some examples, the wire 102 comprises an electrical conductor. The wire 102 includes any number of sizes, shapes, constructions, etc. Indeed, in other examples, the wire 102 may be larger or smaller in cross-sectional size than as illustrated.

In general, the structure 100 can be supported by an electrical insulator 104. For example, the structure 100 can be attached to the electrical insulator 104, such that the structure 100 rests upon and is supported by the electrical insulator 104. The electrical insulator 104 can withstand operating voltage and electrical surges. The electrical insulator 104 can include any number of materials. In an example, the electrical insulator 104 includes porcelain, though other materials are envisioned, including ceramic, glass, polymers, or the like. In the illustrated example, the electrical insulator 104 may include one or more sheds that project radially outwardly from a center of the electrical insulator 104.

Figure 2:
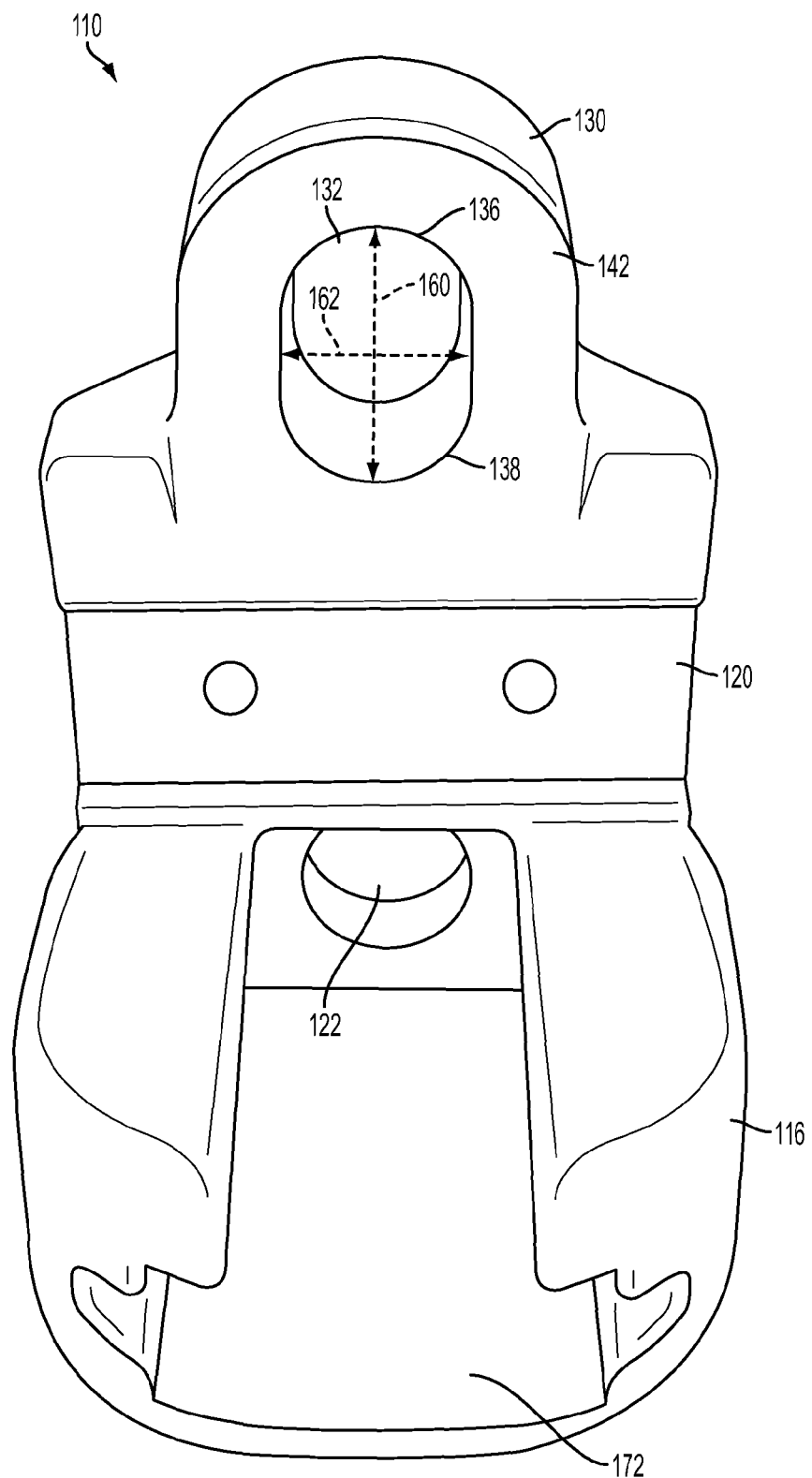
FIG. 2 illustrates an example first portion of an example structure.

Referring now to FIGS. 1 and 2 illustrating the structure 100, the structure 100 may include a first portion 110 and a second portion 112. In some examples, the first portion 110 and the second portion 112 of the structure 100 may include a non-conductive material, such as nylons, plastics, polymers, or the like.

The first portion 110 of the structure 100 can extend along a first axis 114. In an example, the first portion comprises a base portion 116. The base portion 116 may comprise a lower portion of the first portion 110. In an example, the base portion 116 can be attached 118 (illustrated generically/schematically with arrowheads) to the electrical insulator 104. The base portion 116 can be attached 118 in any number of ways, such as with adhesives, mechanical fasteners (e.g., nuts, bolts, screws, etc.), locking/threading attachment, or the like.

The first portion 110 of the structure 100 comprises a body portion 120. In an example, the body portion 120 may extend from an end of the base portion 116 along the first axis 114. The body portion 120 comprises any number of heights/lengths (e.g., such as by extending a longer or shorter distance vertically), and is not limited to the specific dimensions illustrated herein. In an example, as illustrated in FIG. 2, the body portion 120 defines a body opening 122 into which a fastener (e.g., second fastener 124) can be received. The body opening 122 may be disposed at a lower end of the body portion 120, such that the body opening 122 is aligned with the base portion 116. The second fastener 124 comprises any number of fasteners that are sized/shaped to be received within the body opening 122. For example, the second fastener 124 can include screws, bolts, etc. and, in some examples, may be threaded.

The first portion 110 of the structure 100 comprises an alignment portion 130 coupled to the body portion 120. In an example, the alignment portion 130 is coupled to an end of the body portion 120 that is opposite the base portion 116. The alignment portion 130 defines a first alignment opening 132 through which the alignment portion 130 can receive a first fastener 134. In this example, the first alignment opening 132 is at least partially defined by an upper wall 136 and a lower wall 138. The first alignment opening 132 can extend through the alignment portion 130 between a first side 140 of the alignment portion 130 and a second side 142 of the alignment portion 130.

The alignment portion 130 comprises a first surface portion 144 that is located adjacent a midpoint of the first alignment opening 132 along the first axis 114. In an example, the first surface portion 144 is separated a first distance 146 from the first axis 114 along which the alignment portion 130 extends. The alignment portion 130 comprises a second surface portion 150 that is located adjacent the lower wall 138 of the alignment portion 130 defining the first alignment opening 132. According to some examples, the second surface portion 150 is separated a second distance 152 from the first axis 114. In some examples, the first distance 146 is different than the second distance 152. In an example, the second distance 152 is less than the first distance 146.

In the illustrated example, the first side 140 of the alignment portion 130 surrounding the first alignment opening 132 comprises an angled surface 154. In such an example, the first surface portion 144 is located a farther distance from the second side 142 than the second surface portion 150. The angled surface 154 of the first side 140 includes any number of shapes. In the illustrated example, this angled surface 154 comprises a rounded, arcuate shape that has a peak width adjacent the midpoint of the first alignment opening 132 along the first axis 114. The illustrated angled surface 154 is not intended to be limiting, however, and in other examples, may have a conic shape.

As illustrated in FIG. 2, in an example the first alignment opening 132 has an elongated, non-circular cross-sectional shape having an opening length 160 (e.g., up/down in FIGS. 1 and 2) extending along the first axis 114 and an opening width 162 (e.g., into/out of page in FIG. 1) extending substantially transverse to the first axis 114. In some examples, the opening length 160 is greater than the opening width 162. In this example, the first alignment opening 132 has an elongated oval shape in which the upper wall 136 and the lower wall 138 are rounded/curved while lateral walls are generally straight. Such as shape is not intended to be limiting, however, and in other examples, the first alignment opening 132 may include a rectangular shape. In these examples, the first alignment opening 132 has a size that is larger than a cross-sectional size of the first fastener 134 such that the first fastener 134 can move/translate within the first alignment opening 132 up and down along the first axis 114.

Referring to FIG. 1, the structure 100 may include the second portion 112. In this example, the second portion 112 can engage with the first portion 110 such that the second portion 112 is movably attachable to the first portion 110. In an example, the base portion 116 of the first portion 110 defines a channel 172 into which a lower portion of the second portion 112 can be received.

The second portion 112 can include a fastener opening 174 extending at least partially through the lower portion of the second portion 112. The fastener opening 174 is sized/shaped to receive the second fastener 124. In an example, the fastener opening 174 may be threaded such that the second fastener 124 can threadingly engage the fastener opening 174 so as to movably attach the first portion 110 to the second portion 112. In such an example, the second fastener 124 can be tightened/loosened (e.g., by rotating clockwise or counterclockwise) such that the second portion 112 and the first portion 110 can be moved closer together or farther apart.

The second portion 112 can define a second alignment opening 176 through which the second portion 112 can receive the first fastener 134 such that the second portion 112 is attached to the first portion 110. In some examples, the second alignment opening 176 is positioned at an upper end of the second portion 112 opposite the fastener opening 174. The second alignment opening 176 is sized/shaped to receive the first fastener 134. In an example, the second alignment opening 176 may be threaded such that the first fastener 134 can threadingly engage the second alignment opening 176 so as to movably attach the first portion 110 to the second portion 112. In such an example, the first fastener 134 can be tightened/loosened (e.g., by rotating clockwise or counterclockwise) such that the second portion 112 and the first portion 110 can be moved closer together or farther apart.

The structure 100 can include a first mating portion 180 and a second mating portion 182. In an example, the first mating portion 180 may be attached to the first portion 110 while the second mating portion 182 may be attached to the second portion 112. The first mating portion 180 can be attached to the first portion 110 in any number of ways, such as with adhesives, fasteners (e.g., screws, bolts, etc.), locking structures, snap fit attachment (e.g., first mating portion 180 received within slot in first portion 110) or the like. Likewise, the second mating portion 182 can be attached to the second portion 112 in any number of ways, such as with adhesives, fasteners (e.g., screws, bolts, etc.), locking structures, snap fit attachment (e.g., second mating portion 182 received within slot in second portion 112) or the like.

The first mating portion 180 and the second mating portion 182 can contact/engage the wire 102 when the wire 102 is positioned within and/or supported by the structure 100. In an example, the wire 102 may be sandwiched between the first mating portion 180 and the second mating portion 182. The first mating portion and the second mating portion 182 comprise any number of materials. In an example, the first mating portion and the second mating portion 182 comprise a conductive material, such as metals (e.g., bronze, for example). In other examples, the first mating portion and the second mating portion 182 comprise a non-conductive material, such as nylons, plastics, or the like.

Figure 3:
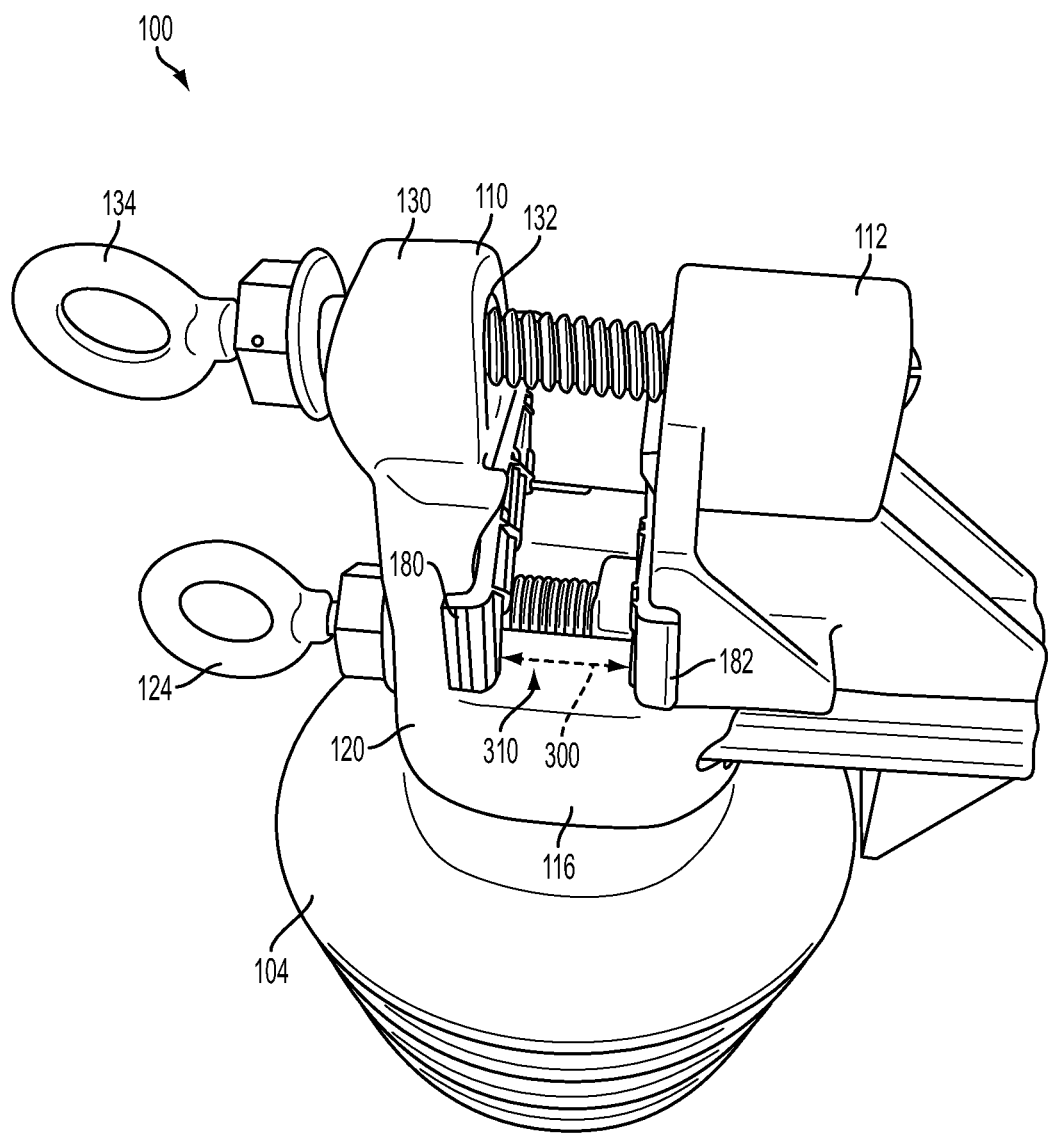
FIG. 3 illustrates an example structure.

Turning to FIG. 3, the structure 100 is illustrated with the first portion 110 separated from the second portion 112 such that the structure 100 can receive the wire 102. In an example, the first fastener 134 and the second fastener 124 can be rotated so as to move the second portion 112 into closer proximity to or farther proximity from the first portion 110. In this example, the second portion 112 may be spaced a distance 300 from the body portion 120 of the first portion 110 to define a wire opening 310 into which the wire 102 is received for support by the structure 100. It will be appreciated that the wire 102 is not illustrated in FIG. 3, but, instead, is illustrated in FIG. 4, for illustrative purposes and to more clearly show portions of the structure 100 in FIG. 3.

Figure 4:
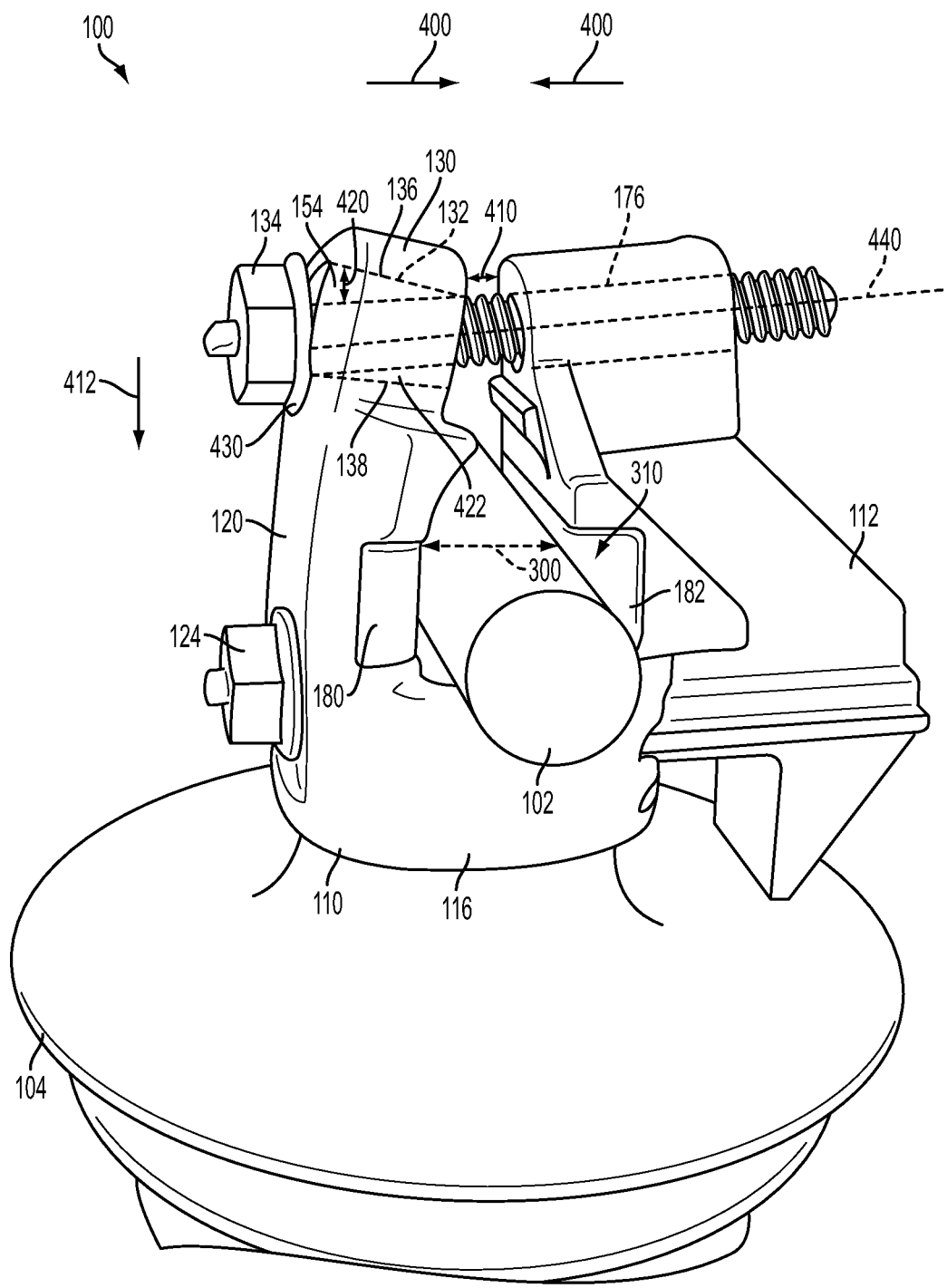
FIG. 4 illustrates an example structure.

Turning now to FIG. 4, the wire 102 can be received within the wire opening 310. It will be appreciated that in an example, the wire 102 may be received within the wire opening 310 before the first fastener 134 is inserted through the first alignment opening 132 and the second alignment opening 176. For example, the wire 102 may first be inserted/received within the wire opening 310. With the wire 102 in place, the first fastener 134 may then be inserted into the first alignment opening 132 and the second alignment opening 176. Once the wire 102 is received within the wire opening 310, the first portion 110 and the second portion 112 of the structure 100 can be moved 400 towards each other. This movement 400 is illustrated generically/schematically with arrowheads. This movement 400 can be accomplished by rotating and tightening the first fastener 134 and the second fastener 124, such that the wire 102 is sandwiched between the first portion 110 and the second portion 112.

When the wire 102 is received within the wire opening 310 and the second portion 112 is attached to the first portion 110 via the first fastener 134, the second portion 112 may be spaced a separating distance 410 from the alignment portion 130. In an example, the first fastener 134 can be tightened to a greater degree than the second fastener 124, such that the alignment portion 130 may be brought into closer proximity to the second portion 112 than the body portion 120. As such, the separating distance 410 (e.g., between the alignment portion 130 and the second portion 112) is less than the distance 300 (e.g., between the body portion 120 and the second portion 112).

Due to this separating distance 410 being less than the distance 300, the first portion 110 may exhibit at least some degree of flexion, bending, bowing, etc., as illustrated. Indeed, this flexion, bending, bowing, etc. of the first portion 110 allows for the first fastener 134 to move 412 in a downward direction towards the body portion 120. In an example, the first fastener 134 can move downwardly within the first alignment opening 132 towards the lower wall 138 and away from the upper wall 136. In this example, the first fastener 134 is separated a first alignment distance 420 from the upper wall 136 of the alignment portion 130 defining the first alignment opening 132. The first fastener 134 is separated a second alignment distance 422 from the lower wall 138 of the alignment portion 130 defining the first alignment opening 132. In the illustrated example, when the wire 102 is received within the wire opening 310 and the second portion 112 is attached to the first portion 110 via the first fastener 134, the second alignment distance 422 is less than the first alignment distance 420.

To further accommodate for the movement 412 of the first fastener 134 within the first alignment opening 132, a contact surface 430 of the first fastener 134 that is in contact with the angled surface 154 can move downwardly along the angled surface 154 towards the second surface portion 150. As such, the angled surface 154 along with the elongated first alignment opening 132 allow for the first fastener 134 to move 412 in a downward direction.

As a result of the movement 412 of the first fastener 134 downwardly within the first alignment opening 132, when the wire 102 is received within the wire opening 310 and the second portion 112 is attached to the first portion 110 via the first fastener 134, the first fastener 134 extends along a substantially linear axis 440. Indeed, the first fastener 134, when extending through the first alignment opening 132 and the second alignment opening 176, can be substantially straight while extending along the substantially linear axis 440. By extending substantially linearly, the first fastener 134 is subjected to a relatively reduced stress and bending moment as opposed to if the first fastener 134 underwent a greater degree of bending/torque. As such, the likelihood of fracture, breakage, deformation, shearing or other effects of stresses on the first fastener 134 is reduced.

Figure 5:
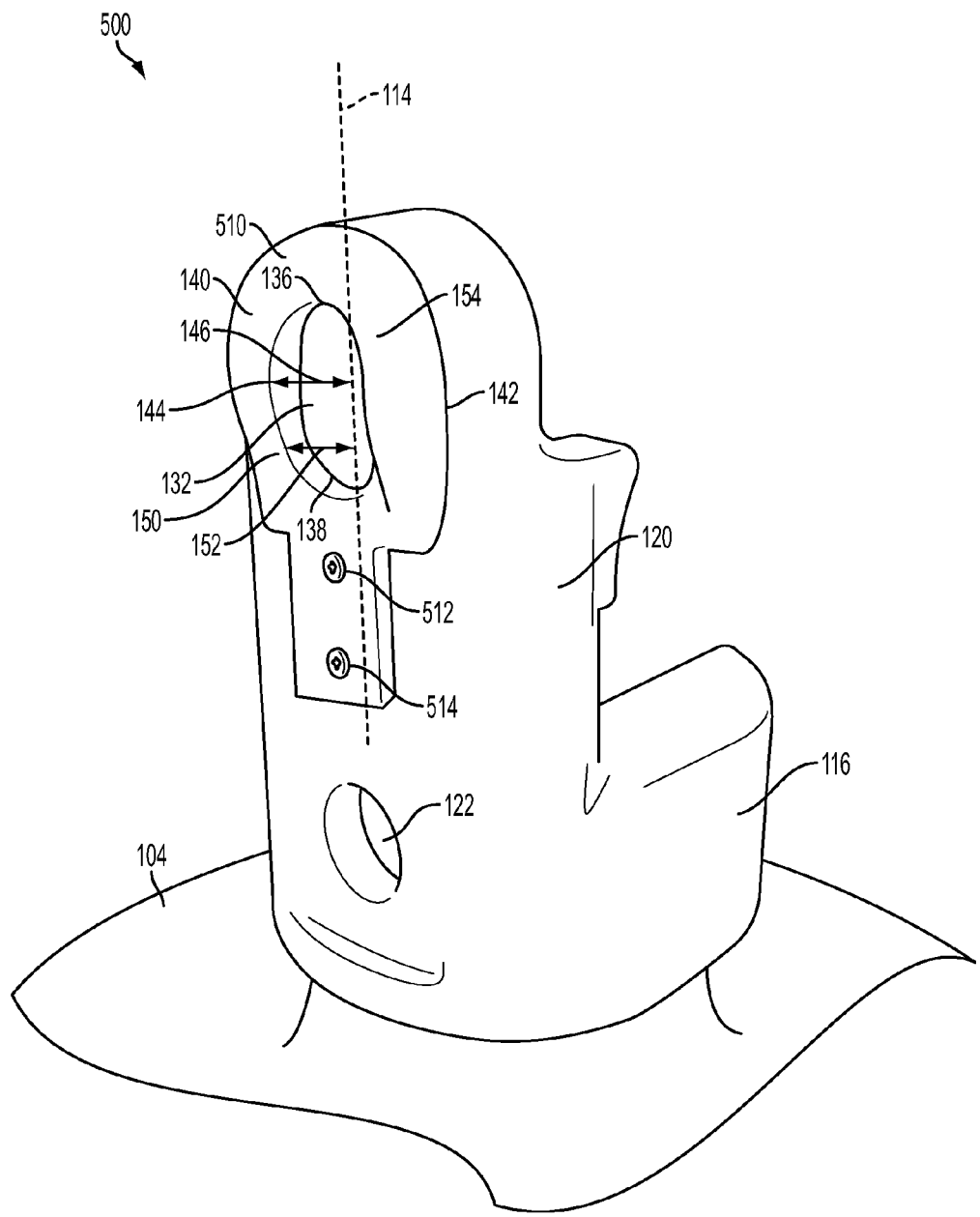
FIG. 5 illustrates an example first portion of an example structure.

Turning to FIG. 5, a second example first portion 500 is illustrated. The first portion 500 is similar in some respects to the first portion 110 of the structure 100. For example, the first portion 500 includes the base portion 116, the body portion 120, etc. Further, the first portion 500 is sized/shaped to engage/attach to the second portion 112. Together, the first portion 500 and the second portion 112 can support the wire 102 in a similar manner as described above with respect to FIG. 4.

The first portion 500 can include an alignment portion 510 that is separately coupled/attached to the body portion 120. In such an example, the alignment portion 510 can be attached in any number of ways to the body portion 120. For example, the alignment portion 510 can be attached by adhesives, fasteners, locking structures, or the like. In the illustrated example, one or more attachment structures may be provided for attaching the alignment portion 510 to the body portion 120. In this example, the alignment portion 510 is coupled to the body portion 120 by a first attachment structure 512 and a second attachment structure 514. The first attachment structure 512 and the second attachment structure 514 comprise any number of structures, such as screws, bolts, or the like.

Figure 6:
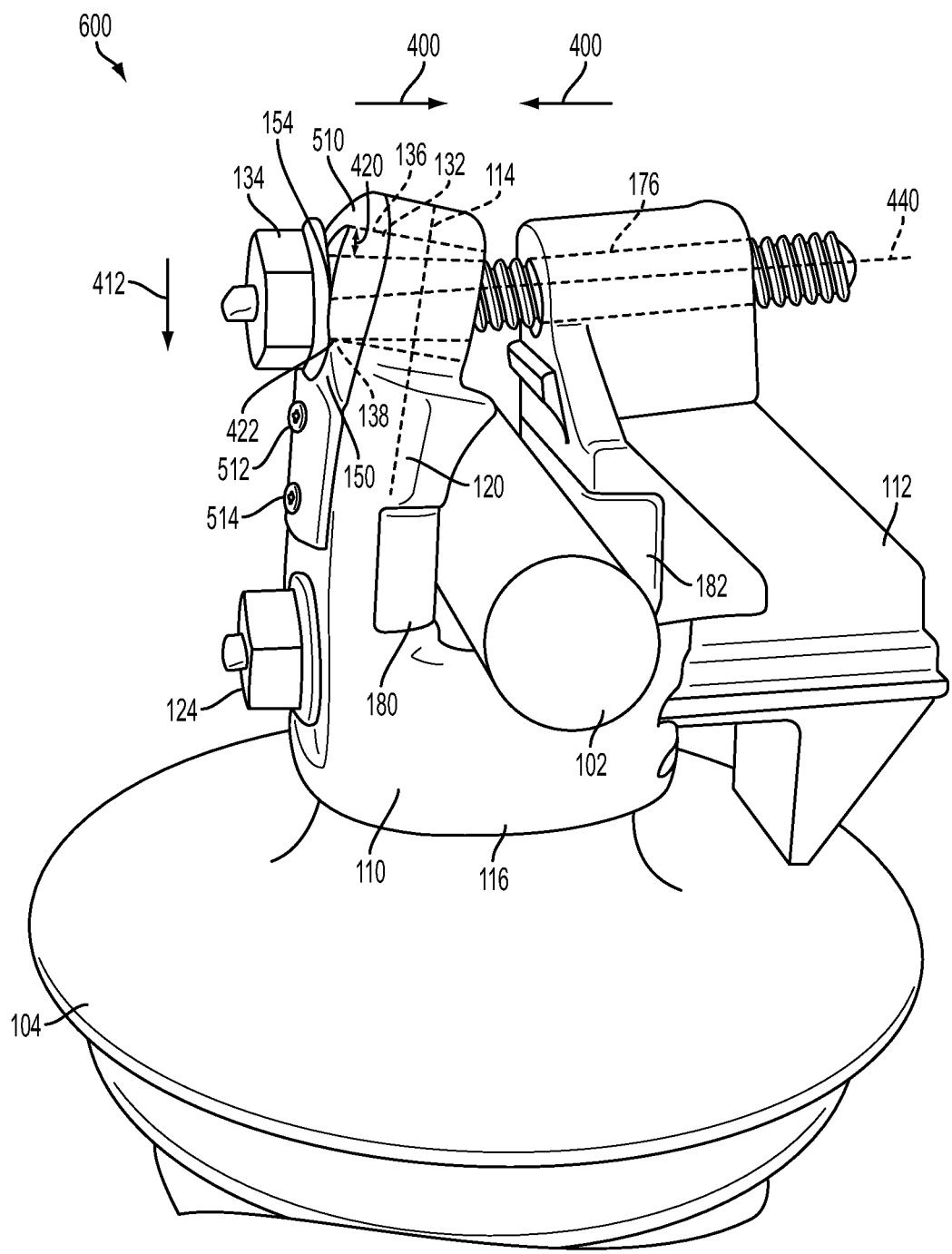
FIG. 6 illustrates an example structure.

FIG. 6 illustrates a second example structure 600. In this example, once the alignment portion 510 is attached to the body portion 120, the alignment portion 510 functions substantially identically to the alignment portion 130 described above with respect to FIGS. 1 to 4. For example, the alignment portion 510 may include the first alignment opening 132 through which the alignment portion 510 can receive the first fastener 134. The first alignment opening 132 is again defined by the upper wall 136 and the lower wall 138. The first alignment opening 132 can extend between the first side 140 of the alignment portion 510 and the second side 142 of the alignment portion 510. The alignment portion 510 may include the first surface portion 144 located adjacent the midpoint of the first alignment opening 132. The alignment portion 510 may include the second surface portion 150 located adjacent the lower wall 138 of the alignment portion 510.

In the illustrated example, the first side 140 of the alignment portion 510 has the first surface portion 144 and the second surface portion 150. In this example, the first surface portion 144 is separated the first distance 146 from the first axis 114. Similarly, the second surface portion 150 is separated the second distance 152 from the first axis 114. In this example, the first distance 146 is different than the second distance 152. For example, the second distance 152 may be less than the first distance 146.

In operation, the first fastener 134 can move 412 downwardly within the first alignment opening 132. As such, when the wire 102 is received within the wire opening 310 and the second portion 112 is attached to the first portion 110 via the first fastener 134, the first fastener 134 extends along the substantially linear axis 440. In such an example, the first fastener 134, when extending through the first alignment opening 132 of the alignment portion 510 and through the second alignment opening 176, can be substantially straight while extending along the substantially linear axis 440. By extending substantially linearly, the first fastener 134 is subjected to a relatively reduced stress and bending moment as opposed to if the first fastener 134 underwent a greater degree of bending/torque. As such, the likelihood of fracture, breakage, deformation, shearing or other effects of stresses on the first fastener 134 is reduced.

In some examples, a kit may be provided comprising the alignment portion 510. In such an example, the alignment portion 510 can be coupled to the body portion 120 of the structure 600 for supporting the wire 102. In this example, the body portion 120 extends along the first axis 114. The alignment portion 510 can define the first alignment opening 132 through which the alignment portion can receive the first fastener 134. The first alignment opening 132 extends between the first side 140 and the second side 142 of the alignment portion 510. The first side 140 of the alignment portion has the first surface portion 144 and the second surface portion 150. The first surface portion 144 is separated the first distance 146 from the first axis 114. The second surface portion 150 is separated the second distance 152 from the first axis 114. The first distance 146 may be different than the second distance 152.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first portion and a second portion generally correspond to portion A and portion B or two different or two identical portions or the same portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A structure for supporting a wire, the structure comprising:
    a first portion extending along a first axis, the first portion comprising:
        a body portion; and
        an alignment portion coupled to the body portion, the alignment portion defining a first alignment opening through which the alignment portion is configured to receive a first fastener, the first alignment opening extending between a first side of the alignment portion and a second side of the alignment portion, the first side of the alignment portion having a first surface portion and a second surface portion, the first surface portion separated a first distance from the first axis, the second surface portion separated a second distance from the first axis, the first distance different than the second distance; and
    a second portion defining a second alignment opening through which the second portion is configured to receive the first fastener such that the second portion is attached to the first portion, the second portion spaced a distance from the body portion of the first portion to define a wire opening into which the wire is received for support by the structure;
    wherein when the wire is not received within the wire opening, the body portion and the alignment portion extend substantially linearly with respect to one another along the first axis, and when the wire is received within the wire opening and the second portion is attached to the first portion via the first fastener, the body portion and the alignment portion extend nonlinearly with respect to one another along the first axis.

2. The structure of claim 1, wherein the second portion is spaced a separating distance from the alignment portion.

3. The structure of claim 2, wherein when the wire is received within the wire opening and the second portion is attached to the first portion via the first fastener, the separating distance is less than the distance.

4. The structure of claim 1, wherein the first fastener is separated a first alignment distance from an upper wall of the alignment portion defining the first alignment opening, the first fastener separated a second alignment distance from a lower wall of the alignment portion defining the first alignment opening.

5. The structure of claim 4, wherein when the wire is received within the wire opening and the second portion is attached to the first portion via the first fastener, the second alignment distance is less than the first alignment distance.

6. The structure of claim 1, wherein when the wire is received within the wire opening and the second portion is attached to the first portion via the first fastener, the first fastener extends along a substantially linear axis.

7. The structure of claim 1, wherein the first alignment opening has an elongated, non-circular cross-sectional shape having an opening length extending along the first axis and an opening width extending substantially transverse to the first axis, the opening length greater than the opening width.

8. The structure of claim 1, wherein the first surface portion of the alignment portion is located adjacent a midpoint of the first alignment opening along the first axis.

9. The structure of claim 8, wherein the second surface portion of the alignment portion is located adjacent a lower wall of the alignment portion defining the first alignment opening.

10. The structure of claim 9, wherein the second distance is less than the first distance.

11. The structure of claim 1, wherein the alignment portion is coupled to the body portion by a first attachment structure.

12. A structure for supporting a wire, the structure comprising:
  a first portion extending along a first axis, the first portion comprising:
    a body portion; and
    an alignment portion coupled to the body portion, the alignment portion defining a first alignment opening through which the alignment portion is configured to receive a first fastener, the first fastener extending along a first fastener axis, the first alignment opening extending between a first side of the alignment portion and a second side of the alignment portion, the first alignment opening having an elongated, non-circular cross-sectional shape having an opening length extending along the first axis and an opening width extending substantially transverse to the first axis, the opening length greater than the opening width, the opening length substantially constant between the first side of the alignment portion and the second side of the alignment portion; and
  a second portion defining a second alignment opening through which the second portion is configured to receive the first fastener such that the second portion is attached to the first portion, the second portion spaced a distance from the body portion of the first portion to define a wire opening into which the wire is received for support by the structure, the wire extending along a wire axis that is substantially perpendicular to the first fastener axis along which the first fastener extends.

13. The structure of claim 12, wherein the second portion is spaced a separating distance from the alignment portion.

14. The structure of claim 13, wherein when the wire is received within the wire opening and the second portion is attached to the first portion via the first fastener, the separating distance is less than the distance.

15. The structure of claim 12, wherein the first fastener is separated a first alignment distance from an upper wall of the alignment portion defining the first alignment opening, the first fastener separated a second alignment distance from a lower wall of the alignment portion defining the first alignment opening.

16. The structure of claim 15, wherein when the wire is received within the wire opening and the second portion is attached to the first portion via the first fastener, the second alignment distance is less than the first alignment distance.

17. The structure of claim 12, an upper wall and a lower wall of the alignment portion defining the first alignment opening, the upper wall and the lower wall substantially parallel.

18. A structure for supporting a wire, the structure comprising:
  a first portion extending along a first axis, the first portion comprising:
    a body portion; and
    an alignment portion coupled to the body portion, the alignment portion defining a first alignment opening through which the alignment portion is configured to receive a first fastener, the first alignment opening extending between a first side of the alignment portion and a second side of the alignment portion, the first side of the alignment portion having a first surface portion and a second surface portion, the first surface portion separated a first distance from the first axis, the second surface portion separated a second distance from the first axis, the first distance different than the second distance; and
  a second portion defining a second alignment opening through which the second portion is configured to receive the first fastener such that the second portion is attached to the first portion, the second portion spaced a distance from the body portion of the first portion to define a wire opening into which the wire is received for support by the structure, the first portion defining a channel into which a portion of the second portion is configured to be received;
  wherein when the wire is received within the wire opening and the second portion is attached to the first portion via the first fastener:
    the first fastener is separated, adjacent to the first side of the alignment portion, a first alignment distance from an upper wall of the alignment portion defining the first alignment opening, and
    the first fastener is separated, adjacent to the first side of the alignment portion, a second alignment distance from a lower wall of the alignment portion defining the first alignment opening, the second alignment distance less than the first alignment distance.

19. The structure of claim 18, the first portion comprising:
  a base portion coupled to the body portion, the base portion defining a second alignment opening through which the base portion is configured to receive a second fastener, the second alignment opening extending between a first alignment side of the base portion and a second alignment side of the base portion;

wherein when the first fastener is received through the first alignment opening and when the second fastener is received through the second alignment opening, the first fastener and the second fastener extend substantially parallel.

20. The structure of claim 19, wherein the wire is positioned between the first fastener and the second fastener.

\* \* \* \* \*